United States Patent
Locke et al.

(10) Patent No.: US 10,586,999 B2
(45) Date of Patent: Mar. 10, 2020

(54) ELECTROLYTE POUCH CELL, METHOD OF MAKING SAME, AND BATTERY SYSTEM THEREFOR

(71) Applicant: INDUSTRIE-PARTNER GmBH RADEBEUL-COSWIG, Coswig (DE)

(72) Inventors: Christin Locke, Coswig (DE); Falko Hahnewald, Doberschau-Gaussig (DE); Georg Handrick, Bernsdorf (DE); Ralf Josef Hock, Chemnitz (DE)

(73) Assignee: INDUSTRIE-PARTNER GMBH RADEUL-COSWIG, Coswig (DE)

( * ) Notice: Subject to any disclaimer, the term of this patent is extended or adjusted under 35 U.S.C. 154(b) by 41 days.

(21) Appl. No.: 15/569,317

(22) PCT Filed: May 20, 2016

(86) PCT No.: PCT/EP2016/000841
§ 371 (c)(1),
(2) Date: Oct. 25, 2017

(87) PCT Pub. No.: WO2016/198145
PCT Pub. Date: Dec. 15, 2016

(65) Prior Publication Data
US 2018/0115012 A1    Apr. 26, 2018

(30) Foreign Application Priority Data
Jun. 9, 2015 (DE) .................. 10 2015 007 196

(51) Int. Cl.
*H01M 10/04* (2006.01)
*H01M 2/36* (2006.01)
(Continued)

(52) U.S. Cl.
CPC ....... *H01M 10/049* (2013.01); *H01M 2/0207* (2013.01); *H01M 2/029* (2013.01);
(Continued)

(58) Field of Classification Search
CPC .. H01M 10/049; H01M 2/0207; H01M 2/361; H01M 2/1211; H01M 2/029;
(Continued)

(56) References Cited

U.S. PATENT DOCUMENTS 8,501,334 B2    8/2013    Yi
8,845,839 B2    9/2014    Yuhara
(Continued)

FOREIGN PATENT DOCUMENTS

KR    1020140067246 A    6/2014

*Primary Examiner* — Michael L Dignan
(74) *Attorney, Agent, or Firm* — Andrew Wilford (57) ABSTRACT

In a method for producing electrolyte pouch cells (1) for an electric battery arrangement, a first flat section (2) of a foil is put into position, a cell stack (8) with integrated electrodes and separators and also attached arresters is arranged and oriented on the positioned first flat section (2), a second flat section of the foil is positioned on the first flat section (2) of said foil and the cell stack (8), and the two flat sections of the foil are welded to one another at their regions which surround the cell stack (8) and are not connected to one another, so as to form a sealed seam. In order to design the electrolyte pouch cell, which is produced using the method outlined above, with a low level of expenditure such that it can be filled under vacuum, can be temporarily closed, is suitable for the removal of forming gas and can once again be finally closed, it is proposed that, in the method outlined above, at least one passage (3) is put into position in the region of the sealed seam before the two flat sections of the foil are welded, and that, when the sealed seam is welded, the at least one passage (3) is sealed into said sealed seam.

18 Claims, 3 Drawing Sheets

(51) Int. Cl.
*H01M 2/02* (2006.01)
*H01M 2/12* (2006.01)
*H01M 6/32* (2006.01)
*H01M 10/058* (2010.01)
*H01M 10/052* (2010.01)

(52) U.S. Cl.
CPC ....... *H01M 2/0275* (2013.01); *H01M 2/0287* (2013.01); *H01M 2/1211* (2013.01); *H01M 2/1229* (2013.01); *H01M 2/361* (2013.01); *H01M 2/362* (2013.01); *H01M 2/364* (2013.01); *H01M 2/365* (2013.01); *H01M 6/32* (2013.01); *H01M 10/0404* (2013.01); *H01M 10/058* (2013.01); *H01M 2/028* (2013.01); *H01M 10/052* (2013.01)

(58) Field of Classification Search
CPC .... H01M 2/0287; H01M 2/0275; H01M 6/32; H01M 10/058; H01M 10/0404; H01M 2/365; H01M 2/364; H01M 2/362; H01M 2/1229; H01M 2/028; H01M 10/052; B65B 39/04; B65B 3/003; B65B 3/027; B65B 3/18; B65B 3/17
See application file for complete search history.

(56) References Cited

U.S. PATENT DOCUMENTS

| | | | | |
|---|---|---|---|---|
| 9,401,501 | B2* | 7/2016 | Bazzarella | H01M 2/0287 |
| 9,698,409 | B2* | 7/2017 | Watanabe | H01M 2/362 |
| 2002/0106555 | A1* | 8/2002 | Langan | H01M 2/0207 |
| | | | | 429/127 |
| 2008/0070101 | A1* | 3/2008 | Barrella | H01M 2/0207 |
| | | | | 429/72 |
| 2009/0032489 | A1* | 2/2009 | Moy | A61J 1/1475 |
| | | | | 215/355 |
| 2014/0023912 | A1* | 1/2014 | Ohira | H01M 2/36 |
| | | | | 429/178 |

* cited by examiner

ELECTROLYTE POUCH CELL, METHOD OF MAKING SAME, AND BATTERY SYSTEM THEREFOR

CROSS REFERENCE TO RELATED APPLICATIONS

This application is the US-national stage of PCT application PCT/EP2016/000841 filed 20 May 2016 and claiming the priority of German patent application 102015007196.3 itself filed 9 Jun. 2015.

The invention relates to a method of making electrolyte pouch cells for electric battery systems, in which a first flat section of a film is put into position, a cell stack with integrated electrodes and separators and also attached arresters is arranged and oriented on the positioned first flat section, a second flat section of the film is positioned on the first flat section of said film and the cell stack and the two flat sections of the film are welded to one another at their regions that surround the cell stack and are not connected to one another so as to form a weld.

Electrolyte pouch cells of this type are joined together in a large number to form electric battery systems. Electrolyte pouch cells known from the prior art are made and then transported as corresponding finished units before joining together to form an electric battery system, which can take place at another site.

Starting from the prior art described previously, it is the object of the invention to provide a method of making electrolyte pouch cells for electric battery systems of the type described initially by means of which it is possible to produce electrolyte pouch cells that can be filled under vacuum with a considerably reduced technical constructive expenditure compared with the prior art, which can be temporarily closed, from which forming gas can be removed and which can be finally closed. Furthermore, the accumulation of contaminated waste should be minimized when carrying out the method.

The object is solved according to the invention whereby in the method described previously, before the two flat sections of the film are welded, at least one feedthrough fitting is put into position in the region of the weld and that during the welding of the weld the at least one feedthrough fitting is sealed into said weld. The feedthrough fitting welded in between the two flat section of the film enables this interior to be evacuated without contacting the interior of the electrolyte pouch cell, enables the interior of the electrolyte pouch cell to be filled with the provided electrolyte, enables the interior of the electrolyte pouch cell to be closed temporarily, enables forming gas to be removed from the interior of the electrolyte pouch cell after some time has elapsed after the temporary closure and then enables the interior of the electrolyte pouch cell to be finally closed. Furthermore, in the method according to the invention, the accumulation of contaminated waste is largely reduced.

If in the method according to the invention, a composite film consisting of polypropylene on the inner side is used as film and a polypropylene feedthrough fitting is used as the feedthrough fitting, a firm adhesion can be permanently ensured between the feedthrough fitting and the film as a result of the sameness of the material between the feedthrough fitting and the regions of the film to be welded to this.

The two flat sections to be welded together can be provided as two film sections that are separate from one another, of which one is initially put in place and then the second is put in place after construction of the electrolyte pouch cell. Alternatively it is possible to provide a film section whose length corresponds to twice the length of a flat section and fold this on the first flat section after placing and aligning the cell stack.

Expediently, the two flat sections of the film should be arranged flush with respect to one another before welding.

In order to provide an electrolyte pouch cell that is flexible with regard to the following process steps and can be used in a versatile manner according to the requirement profile, it is advantageous if in the method, a multiplicity of, preferably four, feedthrough fittings are put into place and sealed-in. By this means for example, it is possible to provide different feedthrough fittings for an evacuation, filling and final degassing.

According to an advantageous embodiment of the method according to the invention, plugged ports are provided as feedthrough fittings and a retaining mandrel is inserted in a blind hole of each port, by means of which the port is positioned and its blind hole is held open during welding. The positioning of the electrolyte pouch cell is accomplished by the port(s) in cooperation with a correspondingly configured frame that is described subsequently, which enables a precise alignment of the individual components of the electrolyte pouch cell.

In another embodiment of the method according to the invention, each retaining mandrel is removed from the port assigned to it, after which a metering needle is inserted into the blind hole of the port and the metering needle is pierced through the port to the interior of the electrolyte pouch cell. By this means, the interior of the electrolyte pouch cell is made accessible.

In order to simplify the process described previously, it can be expedient with certain predefined requirement profiles if, before introduction of the metering needle into the blind hole of the port, the blind hole is recessed approximately centrally through another blind hole and a barrier, e.g. having a thickness 1.5 mm, is left in the port between the base of the further blind hole and the interior of the electrolyte pouch cell. The further blind hole can be adapted with regard to its dimensions such as depth and diameter to the metering needle used in the further process to produce the electrolyte pouch cell.

A contamination-free filling of the electrolyte pouch cell with electrolyte can be achieved if the interior of the electrolyte pouch cell is filled with electrolyte through the metering needle, the metering needle is withdrawn from the port and the port is fused during withdrawal of the metering needle. By this means it can be ensured that the port used for filling the interior of the electrolyte pouch cell with electrolyte is closed and therefore sealed before the metering needle is withdrawn from the port in its entirety.

According to a further advantageous embodiment of the method according to the invention, the interior of the electrolyte pouch cell filled with electrolyte can be degassed through a port not used for filling, wherein the corresponding port is fused after the degassing during withdrawal of a degassing needle. By this means whilst reliably avoiding any contaminations, the removal of forming gas from the electrolyte pouch cell after the filling thereof with electrolyte can be ensured.

Alternatively to the previously described plugged port, cannulas having a closure and integrated septum can be provided as feedthrough fittings when implementing the method according to the invention, wherein an overhang section of the flat sections of the film is then provided, the at least one cannula is positioned in the region of the overhang section and the weld is created in the region of the overhang section so that it seals in the at least one cannula. By this means an electrolyte pouch cell is created that can accordingly be used flexibly by the overhang section or by the cannulas provided in the overhang section, in the same way as the previously described electrolyte pouch cell with the plugged port.

The electrolyte pouch cell provided accordingly with cannulas can be further processed in a simple manner if the septum of the closure of the cannula is pierced by a metering needle and the interior of the electrolyte pouch cell is filled with electrolyte through the metering needle.

For degassing of the electrolyte pouch cell filled with electrolyte, the septum of the closure of another cannula is pierced by a degassing needle and the interior of the electrolyte pouch cell is degassed or freed from forming gas.

For the further processing of the electrolyte pouch cell that has been accordingly filled with electrolyte and degassed, it is advantageous if the interior of the electrolyte pouch cell is closed by another weld that is welded at the transition to the overhang section of the flat sections and the overhang section with the at least one cannula fixed there by sections of the first weld is separated from the electrolyte pouch cell.

In a process step prior to the filling, it is possible to ventilate or evacuate the interior of the electrolyte pouch cell through an extraction needle that is preferably also used as a metering needle after a ventilation or evacuation.

In order to ensure wetting of the components on the cell stack side as rapidly as possible over the entire area, in order to ensure as far as possible that the electrolyte pouch cell is filled with electrolyte as far as possible and in order to eliminate any undesired substances remaining inside the interior of the electrolyte pouch cell, it is advantageous if at least two metering needles are used during filling of the interior of the electrolyte pouch cell with electrolyte, of which at least one metering needle is used as outlet needle for over-metered electrolyte. According to the invention, during filling of the interior of the electrolyte pouch cell, this is therefore as it were flushed by the electrolyte, whereby on the one hand a complete filling of the interior with electrolyte is ensured and on the other hand a complete escape of undesired substances.

In order to ensure during the filling process of the electrolyte pouch cell a complete sealing of the same, it is advantageous in the method according to the invention to use a metering needle whose cross-section is slightly tapered toward the needle tip for sealing against the feedthrough fitting that it has pierced and/or that is configured for sealing against the feedthrough fitting with a seal arranged on its lateral surface and/or a sealing device arranged on its end section remote from the needle tip. Accordingly, it can be eliminated that during insertion of the metering needle, undesired substances pass through the feedthrough fitting used for insertion of the metering needle.

An electrolyte pouch cell made according to the previously described method according to the invention can be transported completely safely and with a low expenditure in the state not yet filled with electrolyte without there being any risk of any contaminations occurring during the handling etc. accompanying the transport process. Furthermore, the transport process of a non-filled electrolyte pouch cell is associated with a considerably lower technical=constructive expenditure than the transport of completely filled electrolyte pouch cells. As a result of the method according to the invention, it is readily possible to fill the electrolyte pouch cell with electrolyte only immediately before its joining together with electrolyte pouch cells of the same type to form the electric battery systems already mentioned previously.

An electrolyte pouch cell for electric battery systems, comprising two flat sections of a film welded together by a weld and a cell stack with integrated electrodes and separators as well as attached arresters has at least one feedthrough fitting that is sealed in between the welded together flat sections in the area of the weld and through which the electrolyte pouch cell can be evacuated and filled.

If the film of the electrolyte pouch cell is configured as a composite film consisting of polypropylene on its inner side and the at least one feedthrough fitting of the electrolyte pouch cell is configured as a polypropylene feedthrough fitting, a secure adhesion of the feedthrough fitting or the feedthrough fittings to the film is permanently ensured as a result of the sameness of the material between the inner side of the composite film and the polypropylene feedthrough fitting.

Preferably a plurality of, preferably four, feedthrough fittings are provided in the electrolyte pouch cell according to the invention.

In one embodiment of the electrolyte pouch cell according to the invention, the at least one feedthrough fitting is configured as a plugged port that can be fused after the filling of the electrolyte pouch cell.

This at least one port advantageously has a preferably rounded diamond-shaped cross-section with a centrally arranged blind hole.

The dimension of the cross-section of the port along the weld is advantageously about twice as large as that transverse to the weld.

Alternatively it is possible to configure the at least one feedthrough fitting as a cannula with closure and integrated septum that can be separated from the electrolyte pouch cell after filling of the electrolyte pouch cell with an overhang section of the flat sections of the film.

The composite film used for the manufacture of the electrolyte pouch cell is advantageously configured in three layers and has an inner layer of polypropylene facing the interior of the electrolyte pouch cell, a middle layer of aluminum and an outer layer of polyamide.

Expediently, the electrolyte pouch cell according to the invention is configured as a lithium ion pouch cell.

An apparatus according to the invention for making electrolyte pouch cells for electric battery systems, has an openable and closable structural and sealing frame comprises a first frame part on which in the open position of the structural and sealing frame, the electrolyte pouch cell can be constructed of a first flat section of a film, a cell stack with integrated electrodes and separators as well as attached arresters, and a second flat section arranged on the first flat section and the cell stack located thereon, a second frame part that can be brought to abut against the first frame part for closing the structural and sealing frame so that the two flat sections and the interposed cell stack can be fixed onto one another in the provided system, and a welding device by means of which the flat sections of the film arranged fixedly in the structural and sealing frame can be welded together by a weld.

In order to be able to implement the previously described electrolyte pouch cell preferably according to the method for the manufacture thereof that has also been described previously with comparatively low expenditure, it is proposed that the structural and sealing frame of the apparatus for making electrolyte pouch cells has at least one, preferably four recesses, in which a feedthrough fitting can be placed during construction of the electrolyte pouch cell wherein the at least one feedthrough fitting can be fixed by the weld during welding of the two flat sections of the film.

In order to ensure an system of the at least one feedthrough fitting in or on the electrolyte pouch cell that is as advantageous as possible, it is advantageous if the at least one recess of the structural and sealing frame is formed by two frame parts of the structural and sealing frame during cooperation.

Advantageously the structural and sealing frame is provided with positioning or stop means by means of which the two flat sections of the film can be positioned flush with respect to one another.

For filling the electrolyte pouch cells, the apparatus for the manufacture of the same according to an advantageous embodiment is equipped with a filling frame that has at least one, preferably four, recesses, of which each is assigned a port of the electrolyte pouch cell removed from the structural and sealing frame and by means of which the electrolyte pouch cell can be positioned in the filling frame for filling with electrolyte since the ports can be inserted in these recesses without major expenditure.

In order to enable a reliable closing of the plugged port, it is advantageous to provide the filling frame with a feed-through at each recess assigned to a port and preferably both in front of and behind this recess in each case, through which a heating segment can be guided, by means of which at least the interior-side section of the port can be fused for closure of the same when a metering needle is removed from the port after filling of the electrolyte pouch cell with electrolyte.

In an alternative embodiment of the apparatus according to the invention for making electrolyte pouch cells, the structural and sealing frame is configured as a combined structural and sealing as well as filling frame by means of which welding device, after filling the electrolyte pouch cell with electrolyte, a second weld can be placed on the interior side of the recesses assigned to the feedthrough fittings.

The invention is explained in detail hereinafter by means of embodiments with reference to the drawings. In the figures.

The method according to the invention explained hereinafter with reference to the figures for making electrolyte pouch cells 1 for electric battery systems, the corresponding apparatus and the electrolyte pouch cell 1 according to the invention are explained hereinafter with reference to the production of a lithium ion pouch cell 1.

In the exemplary embodiment shown, the housing of the pouch cell 1 consists of two welded-together flat sections 2 of a composite film formed as aluminum composite film.

The aluminum composite film consists of three plies or layers. The outwardly directed layer of aluminum composite film consists of polyamide, the middle layer of aluminum and the layer directed toward the inner side of the pouch cell 1 consists of polypropylene.

During the manufacture of the pouch cell 1, a polypropylene port 3 is welded in between the flat sections of the aluminum composite film to be welded together. With the aid of this polypropylene port 3, it is made possible or simpler to fill the pouch cell 1 under vacuum, close it temporarily, remove its forming gas and finally close it again.

Figure 1:
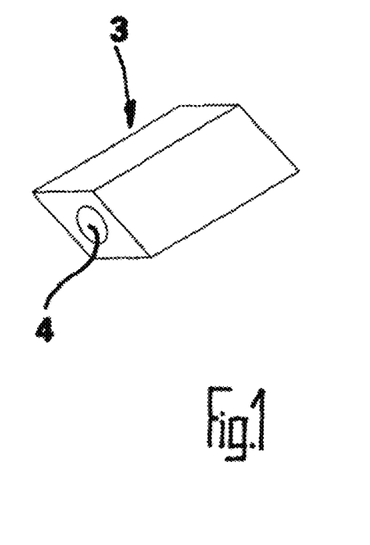
FIG. 1 shows a perspective view of a polypropylene port of one embodiment of an electrolyte pouch cell according to the invention.
Figure 2:
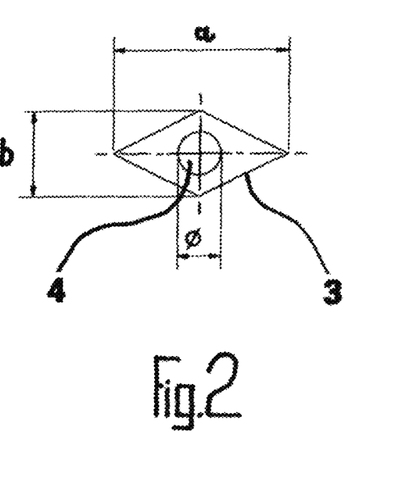
FIG. 2 shows a front view of the polypropylene port shown in FIG. 1.

The polypropylene port 3 shown in FIGS. 1 and 2 by means of an exemplary embodiment has a diamond-shaped cross-section and has a blind hole 4 at the center. The dimension a of the cross-section of the polypropylene port 3 in the longitudinal direction of a weld of the pouch cell 1 is about twice as large as the dimension b transverse to this weld.

The blind hole 4 can, for example, have a diameter of 2 mm and a depth of 3 mm.

Figure 3:
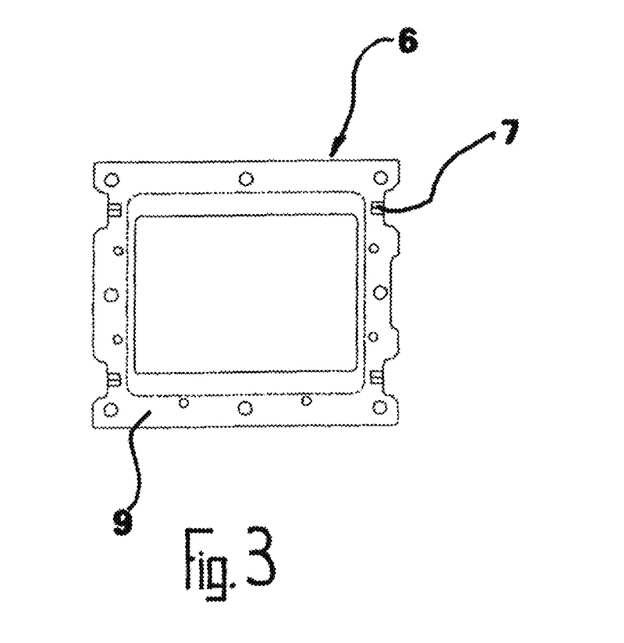
FIG. 3 shows a schematic diagram of a structural and sealing frame of an embodiment of an apparatus according to the invention for making electrolyte pouch cell.

By means of a retaining mandrel 5 shown in FIG. 3 that can be placed in the blind hole 4 of the polypropylene port 3, the polypropylene port 3 can be aligned. Thus, an exact positioning of the polypropylene port 3 is possible.

It should be pointed out that in the exemplary embodiment of the method according to the invention described in the following, the corresponding apparatus and the electrolyte pouch cell 1 made in such a manner, the latter is fitted with four polypropylene ports 3.

A structural and sealing frame 6 that is shown schematically in FIG. 3 is provided for the assembly or construction of the pouch cell 1. In the structural and sealing frame 6 the components of the pouch cell 1 mentioned in the following can be arranged in precise alignment to one another.

The structural and sealing frame 6 is configured to that this covers with solid material the section of the flat sections of the aluminum composite film in which the subsequent weld is formed and presses the two flat sections of the aluminum composite film firmly onto one another. Furthermore, recesses, in the exemplary embodiment shown, four recesses 7 are formed in the structural and sealing frame 6 that are adapted in their shape to the shape of the polypropylene port 3. The recesses 7 of the structural and sealing frame 6 are formed jointly by corresponding recesses in two frame parts of the structural and sealing frame that are movable with respect to one another.

Figure 4:
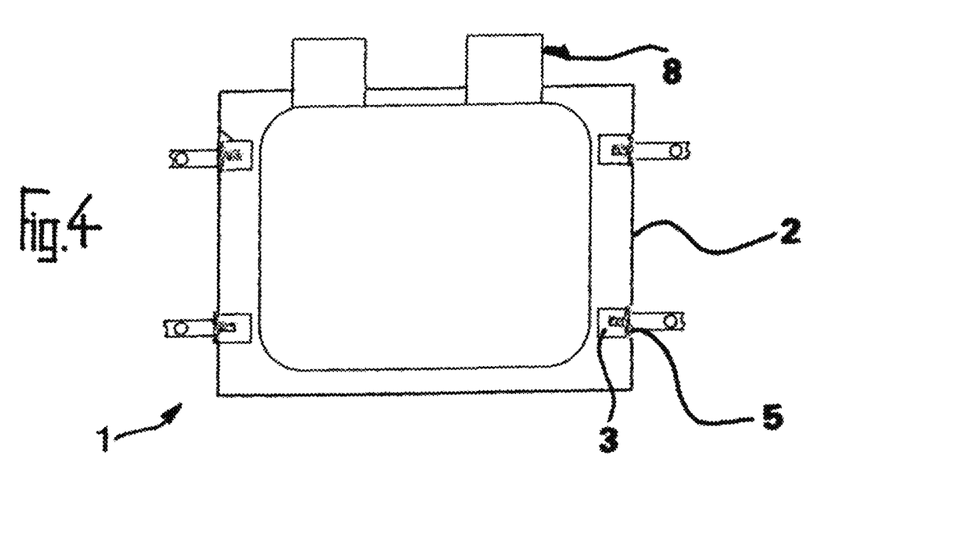
FIG. 4 shows a schematic diagram of the structure of an embodiment of an electrolyte pouch cell according to the invention.

The pouch cell 1 shown schematically in FIG. 4 by means of its cell structure is constructed within the structural and sealing frame 6. For this purpose, the structural and sealing frame 6 is located in its open position in which the second frame part is arranged removed from the first frame part 9.

The first flat section 2 of the aluminum composite film is placed on the first frame part 9 of the structural and sealing frame 6. A cell stack 8 with integrated electrodes and separator as well as attached arresters is aligned on the first flat section 2. Then in the exemplary embodiment shown four polypropylene ports 3 are placed by the retaining mandrel 5 inserted therein on the first flat section 2 of the aluminum composite film and specifically so that they are arranged in those parts of the recesses 7 of the structural and sealing frame 6 that are formed in the first frame part 9.

Finally the second flat section of the aluminum composite film is positioned on the cell stack 8 flush with the first flat section 2 of the aluminum composite film. For closure of the structural and sealing frame 6, the second frame part of the same is now brought up to the first frame part 9. During production of the system between the two frame parts the cell structure of the pouch cell 1 located in the structural and sealing frame 6 is fixed, whereby the individual components of the cell structure are then aligned firmly with respect to one another.

The structural and sealing frame 6 is additionally configured with a permanently heated welding device. The flat section of the aluminum composite film fixed flush in the structural and sealing frame 6 are now welded together by supplying heat by the heating wires of the welding apparatus integrated in the structural and sealing frame 6. Sealing jaws of the structural and sealing frame 6 are to be heated to a temperature of above 150 degrees C. for this purpose and held at the heating temperature for a specific sealing time depending on the seam conditions. During the sealing process the retaining mandrels 5 remain in the respective polypropylene port 3 and accordingly fill the blind holes 4 of the polypropylene port 3 so that a closure of the polypropylene port 3 by the incipient melting process of the polypropylene is prevented. On the other hand, a connection between the polypropylene port 3 and the polypropylene layer of the aluminum composite film surrounding this is intended. After the end of the welding or the sealing process, a tightly welded pouch cell 1 including polypropylene ports 3 welded therein is obtained.

Figure 5:
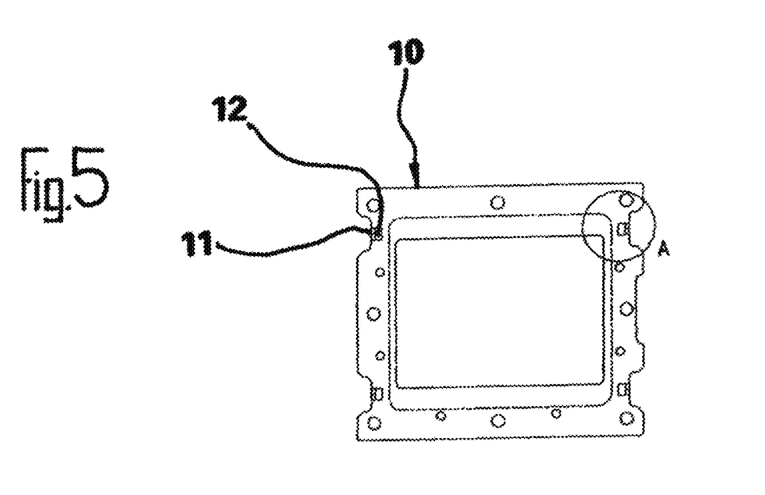
FIG. 5 shows a schematic diagram of a filling frame of an embodiment of an apparatus according to the invention for making electrolyte pouch cells.
Figure 6:
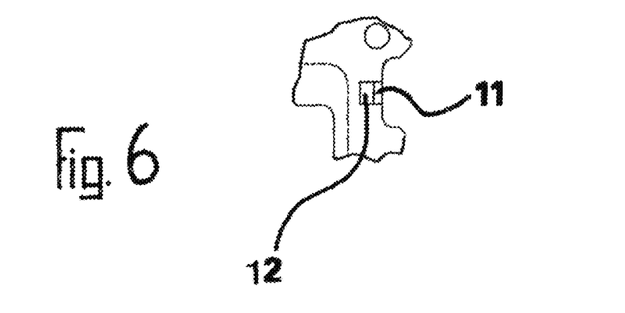
FIG. 6 shows a detail A from FIG. 5 in enlarged view.

The tightly sealed pouch cell 1 made accordingly with polypropylene port 3 sealed therein is removed from this after opening the structural and sealing frame 6 and transferred to a filling frame 10 of the apparatus for making electrolyte pouch cells 1 shown schematically in FIGS. 5 and 6. The filling process takes place inside this filling frame 10 and the fusing or sealing of the polypropylene port 3 that follows this.

Recesses 11 assigned to the polypropylene port 3 are also formed in the filling frame 10, wherein as a result of these recesses 11 in cooperation with the polypropylene port 3 of the pouch cell 1, this can be positioned absolutely correctly in the filling frame 10 and can be fixed in this precisely aligned position.

After fixing the pouch cell 1 inside the filling frame 10, the blind stoppers or retaining mandrels 5 are removed from the blind holes 4 of the polypropylene port 3.

The blind holes 4 are each supplemented by another blind hole not shown in the figures. These additional blind holes running from the base of the blind holes 4 have a diameter whose size is predefined or determined by the diameter of a metering needle to be used in the course of the following filling process. The additional blind hole is created with a depth so that after the end of the additional blind hole, a thin-walled polypropylene barrier having a thickness that is less than or equal to 1.5 mm remains inside the polypropylene port 3.

This polypropylene barrier is pierced by the metering needle, wherein as a result of this piercing process access is created to the interior of the pouch cell 1.

Firstly air is withdrawn from the interior of the pouch cell 1 with the aid of the metering needle, by applying negative pressure to the metering needle. In a following process step the interior of the pouch cell 1 is filled with electrolyte using the same metering needle. This filling process can be regulated by a suitable valve for this purpose.

In this filling process one of several polypropylene ports 3 used in the filling process or the metering needle located therein can be used to allow excess electrolyte introduced into the interior of the pouch cell 1 to escape from the interior of the pouch cell 1. This results in a flushing of the interior of the pouch cell 1 by means of which undesired substances can, as it were, be flushed from this interior, wherein the electrolyte that should otherwise fill the interior of the pouch cell 1 at the end of the filling process is used as flushing liquid.

After filling of the interior of the pouch cell 1 with electrolyte, the polypropylene port 3 should be closed immediately. To this end, the filling frame 10 has a rectangular feed-through 12 at the recesses 11 assigned to the polypropylene port 3 laterally in front of and behind the recess 11. During the slow removal of the metering needle from the polypropylene port 3 parallel to this process a heating segment not shown in the figures is guided through the feed-throughs 12 of the filling frame 10. As a result of the heating effect of the heating segments, at least the rear section of the polypropylene port 3 facing the interior of the pouch cell 1 is fused, whereby a deformation or closing of the polypropylene port 3 is achieved.

In principle, after the completion of the filling of the pouch cell 1 it is possible to use a polypropylene port 3 not used for the filling to remove forming gas present in the interior of the pouch cell 1 after the filling from the pouch cell 1.

The previously described method of making electrolyte pouch cells enables a flexible design of the filling of the pouch cell 1 since the number of polypropylene ports 3 to be welded into the pouch cell 1 or the number of polypropylene ports 3 to be used for filling the interior of the pouch cell 1 is not specified.

In an alternative method according to the invention for making electrolyte pouch cells 1, access to the interior of the pouch cell 1 configured as a lithium ion pouch cell 1 is achieved by using polypropylene cannulas 13. Firstly the pouch cell 1 is assembled or constructed inside a structural and sealing frame and filling frame 14 of the apparatus for making electrolyte pouch cells 1. The corresponding structural and sealing as well as filling frame 14 is shown schematically in FIGS. 7 and 8. During construction of the pouch cell 1 inside the structural and sealing as well as filling frame 14, a precise alignment of the individual components of the pouch cell 1, namely the cell stack 8, the two flat sections of the aluminum composite film and the polypropylene cannulas 13 with respect to one another is ensured. The structural and sealing as well as filling frame 14 is designed so that this covers with solid material those regions of the flat sections of the aluminum composite film in which a first weld 15 runs subsequently and presses the two flat sections of the aluminum composite film firmly onto one another.

Figure 7:
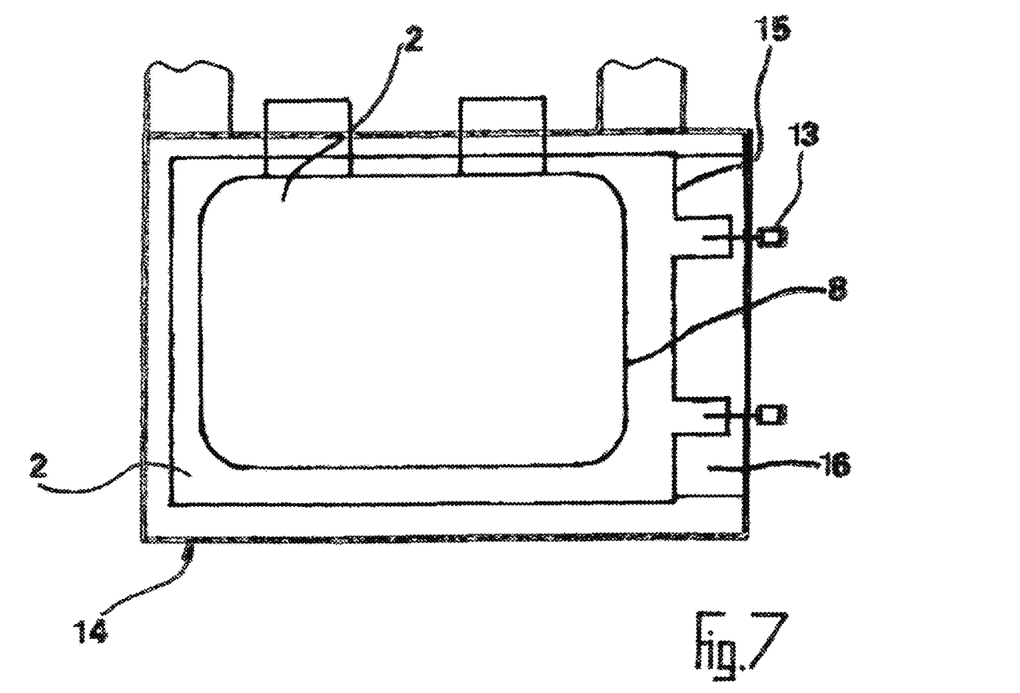
FIG. 7 shows a schematic diagram of another embodiment of a structural and sealing as well as filling frame of another embodiment of an apparatus according to the invention for making electrolyte pouch cells during the construction or filling step.

The cell structure of the pouch cell 1 is created in the open position of the structural and sealing as well as filling frame 14. To this end firstly the first flat section 2 is positioned on the first frame part. The cell stack 8 then follows. The polypropylene cannulas 13 are then positioned according to the recesses 16 provided in the structural and sealing as well as filling frame 14, e.g. at a vertical edge of the pouch cell 1. Finally the second flat section of the aluminum composite film is placed on the cell structure created so far flush with respect to the first flat section 2.

The two flat sections of the aluminum composite film are firstly selected with a larger width in relation to the dimensions of the pouch cell 1. The overhang section 16 of the flat sections thus formed is used to obtain a pouch pack that for the most part has contamination-free welds.

Inside the structural and sealing as well as filling frame 14, almost all the main dimensions of the pouch cell 1 are already sealed with the aid of a welding apparatus provided therein, as shown in FIG. 7.

During this sealing or welding process in which the first weld 15 is created, the polypropylene cannulas 13 are sealed in. Here the flat sections of the aluminum composite film fixed flush by the structural and sealing as well as filling frame 14 are welded together by supply of heat from the welding apparatus that has heating wires integrated in the structural and sealing as well as filling frame 14. Here sealing jaws of the structural and sealing as well as filling frame 14 are to be heated to a temperature above 150 degrees C. and held at this heating temperature for a specific sealing time depending on the seam conditions.

As a result of the sealing of the polypropylene channel 13, the interior of the pouch cell 1 can be evacuated and then filled.

The polypropylene cannulas 13 contain closures in which a septum is integrated. By this means access to the interior of the pouch cell 1 can be opened and closed again multiple times.

The filling or evacuating of the interior of the pouch cell 1 is achieved by piercing the septum of the closure or lid and thus creating access to the interior of the pouch cell 1. The filling process can thus be designed flexibly. As soon as the filling and optionally the process step of pre-forming is ended, the pouch cells 1 can be adapted to their actual dimensions.

Figure 8:
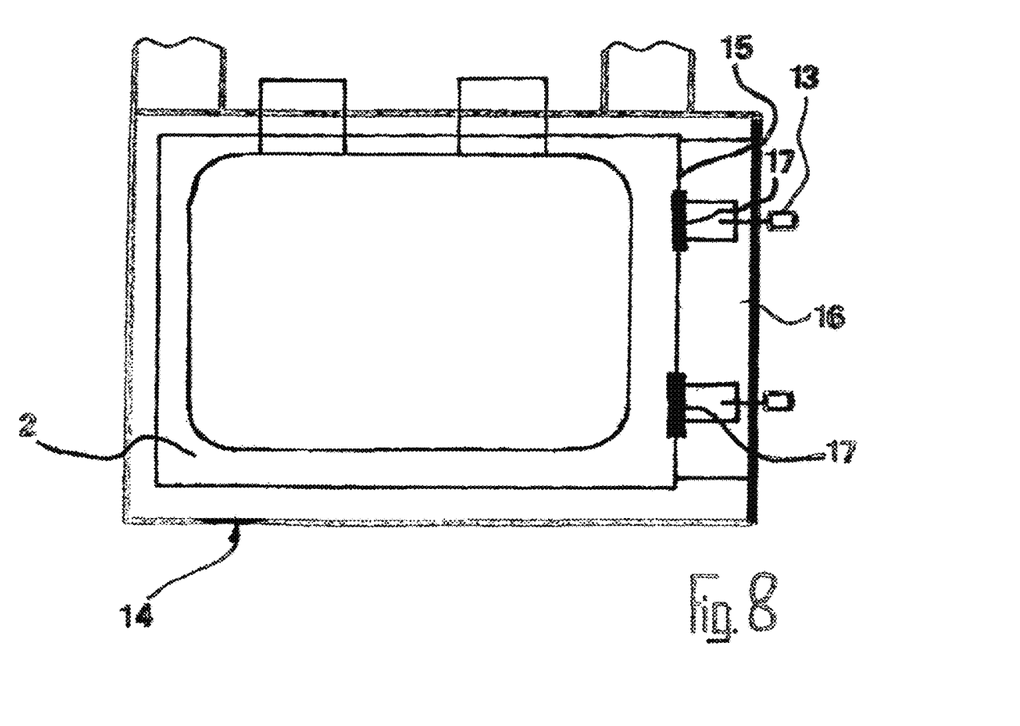
FIG. 8 shows the structural and sealing as well as filling frame shown in FIG. 7 after the filling process step.

For this purpose the pouch cell 1 located as previously inside the structural and sealing as well as filling frame 14 is provided with another weld 17 as shown in FIG. 8. As a result of this additional weld 17, the pouch cell is limited in its actual dimensions and tightly closed. The overhand section 16 including the polypropylene cannulas 13 sealed therein can now be separated and removed. The separation takes place after the pouch cell 1 has been removed from the structural and sealing as well as filling frame.

The invention claimed is:

1. A method of making electrolyte pouch cells for electric battery systems, the method comprising the steps of sequentially:
    positioning a first flat section of a film;
    placing a cell stack with integrated electrodes, separators, and attached arresters on the positioned first flat section;
    positioning a second flat section of the film on the cell stack placed on the first flat section of the film;
    placing between the first and second flat sections a plurality of feedthrough fittings at least some of which have ports with blind holes plugged by respective removable mandrels;
    positioning the feedthrough fittings with the plugged holes on the flat first and second sections by means of the respective mandrels; and
    welding the first and second flat sections of the film to one another at regions that surround the cell stack and that are not connected to one another so as to form a weld with the feedthrough fittings extending through the weld such that the feedthrough fittings are sealed into the weld and the mandrels hold the blind holes open during welding.

2. The method according to claim 1, wherein the film is composite film consisting of polypropylene on an inner side and a polypropylene feedthrough fittings are used as the feedthrough fittings.

3. The method according to claim 2, wherein the composite film has an inner layer of polypropylene, a middle layer of aluminum, and an outer layer of polyamide.

4. The method according to claim 1, wherein two film sections that are separate from one another are used as the first and second flat sections.

5. The method according to claim 1, wherein the first and second flat sections are of the same size and shape, the method further comprising:
    arranging the first and second flat sections of the film flush and congruent with respect to one another before welding.

6. The method according to claim 1, further comprising after forming the weld the steps of:
    removing each retaining mandrel from the blind hole of the respective port;
    thereafter inserting a metering needle into the blind hole of one of the ports and
    thereafter passing the metering needles through the one port to an interior of the electrolyte pouch cell.

7. The method according to claim 6, further comprising the steps, before insertion of the metering needle into the blind hole of the one port, of:
    recessing the blind hole of the one port approximately centrally by another blind hole while
    leaving a barrier having a thickness of 1.5 mm in the one port between the base of the other blind hole and the interior of the electrolyte pouch cell.

8. The method according to claim 6, further comprising after the step of piercing the metering needle through the one port the steps of:
    filling the interior of the electrolyte pouch cell with electrolyte through the metering needle,
    withdrawing the metering needle from the one port and
    fusing the one port closed during withdrawal of the metering needle.

9. The method according to claim 8, further comprising step of:
    using at least two of the metering needles during filling of the interior of the electrolyte pouch cell with electrolyte, of which at least one metering needle is used as outlet needle for over-metered electrolyte.

10. The method according to claim 6, further comprising the step of:
    using a metering needle whose cross-section is slightly tapered toward the needle tip for sealing against the feedthrough fitting that it has pierced and/or that is configured for sealing against the feedthrough fitting with a seal arranged on its lateral surface and/or a sealing device arranged on its end section remote from the needle tip.

11. The method according to claim 6, further comprising the step of:
    providing the one port with a rounded diamond-shaped cross-section with a central blind hole.

12. The method according to claim 11, wherein a dimension of the cross-section of the port along the weld is about twice as large as that transverse to the weld.

13. The method according to claim 6, further comprising the steps of:
    degassing the interior of the electrolyte pouch cell filled with electrolyte through another port not used for filling and fusing the other port after the degassing during withdrawal of a degassing needle.

14. The method according to claim 1, further comprising the steps of:
    using a cannula having a closure and integrated septum as feedthrough fittings,
    providing an overhang section of the flat sections of the film,
    positioning the cannula in the region of the overhang section and
    making the weld in the region of the overhang section so that it seals in the cannula.

15. The method according to claim 14, further comprising the step of:
    piercing the septum of the cannula by a metering needle; and
    filling the interior of the electrolyte pouch cell with electrolyte through the metering needle.

16. The method according to claim 15, further comprising the steps of:
    piercing the septum of another cannula by a degassing needle and
    degassing the interior of the electrolyte pouch cell.

17. The method according to claim 14, further comprising the steps of:
    closing the interior of the electrolyte pouch cell by another weld that is welded at the transition to the overhang section of the flat sections and
    separating the overhang section with the at least one cannula fixed there by sections of the first weld from the electrolyte pouch cell.

18. The method according claim 1, further comprising the step of:
    ventilating or evacuating the interior of the electrolyte pouch cell through an extraction needle that is also used as a metering needle after a ventilation or evacuation.

* * * * *